United States Patent
Rai et al.

(10) Patent No.: US 10,054,661 B1
(45) Date of Patent: Aug. 21, 2018

(54) METHOD AND SYSTEM FOR UPDATING CONFIGURATION RECORD OF BASE STATION ANTENNA

(71) Applicant: Sprint Spectrum L.P., Overland Park, KS (US)

(72) Inventors: Deveshkumar N. Rai, Overland Park, KS (US); Satish Thumar, Overland Park, KS (US); Jason P. Sigg, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/676,505

(22) Filed: Aug. 14, 2017

(51) Int. Cl.
*H04W 24/00* (2009.01)
*G01S 3/02* (2006.01)

(52) U.S. Cl.
CPC .................................. *G01S 3/023* (2013.01)

(58) Field of Classification Search
CPC .... H01Q 21/28; H01Q 1/243; H01Q 21/0006; H01Q 9/16; H01Q 25/00; H01Q 3/28; H01Q 3/36; H01Q 3/38; H01Q 9/265; H01Q 21/22; H01Q 3/26; H01Q 5/50; H04B 7/0689; H04B 7/0413; H04B 7/0617; H04B 7/0691; H04B 7/0632; H04B 7/04; H04B 7/0417; H04B 7/0639; H04B 7/0452; H04B 7/063; H04B 7/0652; H04B 17/14; H04B 17/21; H04B 17/327; H04B 2201/709709; H04B 7/0456; H04B 7/0697; H04B 7/0634; H04L 1/0675; H04L 1/0026; H04L 1/06; H04L 1/0001; H04L 1/0003; H04L 1/1887; H04L 1/1896; H04L 25/0204; H04L 2025/03414; H04W 24/02; H04W 16/00; H04W 16/26; H04W 74/004; H04W 74/006; H04W 52/346; H04W 16/14; H04W 16/18; H04W 16/20; H04W 28/08; H04W 72/042; H04W 16/28; H04W 40/04; H04W 4/06; H04W 72/0413; H04W 7/01
See application file for complete search history.

(56) References Cited

U.S. PATENT DOCUMENTS

| | | | |
|---|---|---|---|
| 7,346,359 B2 | 3/2008 | Damarla et al. | |
| 8,120,488 B2 | 2/2012 | Bloy | |
| 2012/0106613 A1* | 5/2012 | Piazza | H01Q 1/1257 375/227 |
| 2014/0169430 A1* | 6/2014 | Nilsson | H04B 7/043 375/227 |
| 2016/0240910 A1* | 8/2016 | Balter | H01Q 1/125 |
| 2017/0201892 A1* | 7/2017 | Wen | H04W 16/28 |

\* cited by examiner

*Primary Examiner* — Nimesh Patel (57) ABSTRACT

An RF fingerprint of the environment of a base station antenna will be regularly monitored, such as by regularly evaluating various RF metrics of uplink reflections of downlink transmission from the antenna. Through regular monitoring of the RF fingerprint, a baseline RF fingerprint could be established. And through continued monitoring of the RF fingerprint, an unexpected change in the RF fingerprint could then be detected, as an indication that the antenna's RF beam direction may have changed. In response to detecting the unexpected change in the antenna's RF fingerprint, the antenna's RF beam direction could then be newly determined, and the antenna's configuration record could be updated to indicate the newly determined RF beam direction.

20 Claims, 8 Drawing Sheets

METHOD AND SYSTEM FOR UPDATING CONFIGURATION RECORD OF BASE STATION ANTENNA

BACKGROUND

A typical wireless communication system includes a number of base stations, each radiating to provide one or more coverage areas in which to serve user equipment devices (UEs) such as cell phones, tablet computers, tracking devices, embedded wireless modules, and other wirelessly equipped devices, whether or not user operated. In turn, each base station could connect with a core access network that includes entities such as a network controller, switches and/or gateways, and the core network could provide connectivity with one or more external networks such as the public switched telephone network (PSTN) and the Internet. With this arrangement, a UE within coverage of the system could engage in air interface communication with a base station and could thereby communicate via the base station with various remote network entities or with other UEs served by the base station.

Such a system could operate in accordance with a particular air interface protocol, examples of which include, without limitation, Long Term Evolution (LTE) (using orthogonal frequency division multiple access (OFDMA) and single-carrier frequency division multiple access (SC-FDMA)), Code Division Multiple Access (CDMA) (e.g., 1×RTT and 1×EV-DO), Global System for Mobile Communications (GSM), IEEE 802.11 (WIFI), and BLUETOOTH. In accordance with the protocol, each coverage area could operate on one or more carrier frequencies, with the air interface being structured to define various channels for carrying downlink communications from the base station to UEs and uplink communications from UEs to the base station. Further, the air interface protocol could define specific procedures for registration of UEs, handover of UEs, and other service of UEs.

For each coverage area of such a system, the base station that provides the coverage area could be equipped with an antenna that has a configured radio frequency (RF) beam direction. In particular, the antenna could be structured to provide a directional radiation pattern that has an azimuth defining the direction of radiation from true north in an x-y reference plane and perhaps an angle of elevation defining a direction of tilt with respect to the x-y reference plane.

The antenna could be physically configured to provide such a directional radiation pattern and could be oriented in a manner that points the radiation pattern in a desired direction, thus establishing the RF beam direction of the antenna. For instance, the antenna could be a phased array structure, having multiple antenna elements set to radiate with varying phase so as to cooperatively establish a directional radiation pattern (which could be electronically steered by adjusting the phases of respective antenna elements), and the phased array structure as a whole could be physically oriented in a manner that points the radiation pattern in a desired direction, thus establishing the RF beam direction of the antenna.

In practice, the RF beam direction of a base station antenna in such a system could be usefully factored into determining the geographic location of a UE served by the system.

For example, when a UE is served by a base station whose antenna has a particular azimuth, the angle of arrival of uplink transmission from the UE to the base station (as determined based on phase differences at antenna elements in the x-y plane for instance) could be offset from the antenna's azimuth to establish the absolute bearing of the UE's position from the base station's position. Given this absolute bearing, given a known geographic location of the base station, and given a distance between the UE and the base station (as determined based on signal delay between the UE and the base station), the UE's geographic location could be computed.

As another example, the wireless system could include a mobile location center (MLC) that is configured to determine and report location of a UE based on consideration of UE-received transmissions from multiple base stations. For instance, when the MLC seeks to determine the UE's location, the MLC could prompt the UE to measure and report signal delay from each of multiple base stations from which the UE detects coverage, and the system could then compute the UE's location based on the reported signal delay measurements and based on knowledge of each base station's azimuth as well as possibly other factors.

OVERVIEW

To facilitate UE location determination and perhaps for other reasons, the RF beam direction of each antenna in such a system could be stored in an associated configuration record. For instance, for each base station coverage area, an operator of the system could establish an antenna configuration record specifying the RF beam direction of the antenna that provides that coverage area.

The configuration record for a base station's antenna could specify the antenna's RF beam direction as an azimuth and/or elevation of the antenna, and the record could be stored at the base station, at an MLC, and/or at another point, to facilitate access for computing UE location. When it becomes necessary to determine a UE's location, the base station, the MLC, and/or another entity could then refer to the configuration record to determine the antenna's RF beam direction, and the entity could factor that RF beam direction into a computation of the UE's location.

Unfortunately, however, the RF beam direction of an antenna as specified by the antenna's configuration record might be incorrect. This could happen, for instance, if the antenna's physical orientation gets changed, due to weather, age-based wear, or other circumstances, without notice. When the RF beam direction of the antenna as specified in the antenna's configuration record is incorrect, the result could be erroneous UE location determination. For instance, if the base station or MLC tries to compute the UE's location as discussed above based on the antenna's azimuth, an error in the antenna's azimuth could result in an error in the computed UE location. And this erroneous location computation could lead to erroneous location-based services and assorted other problems. Consequently, an improvement is desired.

Disclosed herein is a mechanism that could help to overcome or avoid this problem. The disclosure stems from a realization that when the RF beam direction of an antenna changes, uplink reflections of downlink transmission from the antenna may correspondingly change. For instance, given a particular RF beam direction, a pilot signal transmitted from the antenna could reflect off of objects in the environment, and the antenna could receive a reflection with a particular signal strength, time delay, and phase. If the RF beam direction of the antenna changes, however, the pilot signal transmitted from the antenna could reflect differently off of objects in the environment, and the antenna could therefore receive the reflection with a different signal strength, time delay, and/or phase.

Accordingly, the disclosure provides for detecting a threshold change in uplink reflections of downlink transmission from the antenna as a basis to establish that the RF beam direction of the antenna has changed, and to responsively trigger corrective action.

In accordance with the disclosure, an RF fingerprint of the environment of a base station antenna will be regularly monitored, such as by regularly evaluating various RF metrics (e.g., signal strength, delay, and phase) of uplink reflections of downlink transmission from the antenna. Through regular monitoring of the RF fingerprint, a baseline RF fingerprint could be established, possibly on a seasonal basis to account for seasonal changes in environment (such as differences in foliage) if appropriate. And through continued monitoring of the RF fingerprint, an unexpected change in the RF fingerprint could then be detected, as an indication that the antenna's RF beam direction may have changed. In response to detecting the unexpected change in the antenna's RF fingerprint, the antenna's RF beam direction could then be newly determined, and the antenna's configuration record could be updated to indicate the newly determined RF beam direction.

In an example implementation, the RF beam direction at issue could be an azimuth of the antenna. And, in response to detecting the unexpected change in the antenna's RF fingerprint, the azimuth could be newly determined based on an evaluation of where UEs reporting highest downlink signal strength from the antenna have been located. For instance, the base station could receive downlink signal strength measurements from served UEs and could correlate the signal strength reports with geographic locations of the reporting UEs. The base station or another entity could then determine the azimuth of the antenna by determining the locations at which UEs have reported the strongest downlink signal strength from the base station, by determining a best-fit line representing the determined locations and originating at the antenna, and by deeming the azimuth to be the angle of that line (e.g., with respect to north).

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

This description will discuss implementation by way of example in the context of an LTE network. It will be understood, however, that principles of the disclosure can extend to apply in other scenarios as well, such as with different LTE configurations or with other air interface protocols. More generally, elements, arrangements, and operations could be added, removed, combined, distributed, re-ordered, or otherwise modified. In addition, it will be understood that operations described as being performed by one or more entities may be implemented in various ways, such as by one or more processing units executing program instructions for instance.

As noted above, FIG. 1 is a simplified block diagram of an example LTE network in which features of the present disclosure can be implemented. As shown, the LTE network includes an LTE base station (evolved Node-B or eNodeB) 12, which has an antenna 14 and is configured to provide a coverage area 16 in which to serve UEs 18. The eNodeB 12 then has an interface with a serving gateway (SGW) 20, which in turn has an interface with a packet-data network gateway (PGW) 22 that provides connectivity with an external packet-switched network 24. Further, the eNodeB 12 has an interface with a mobility management entity (MME) 26, which has an interface with the SGW 20 and also with a mobile location center (MLC) 28. And the MLC 28 in turn has an interface with a gateway MLC (GMLC) 30 accessible via the packet-switched network 24.

Figure 1:
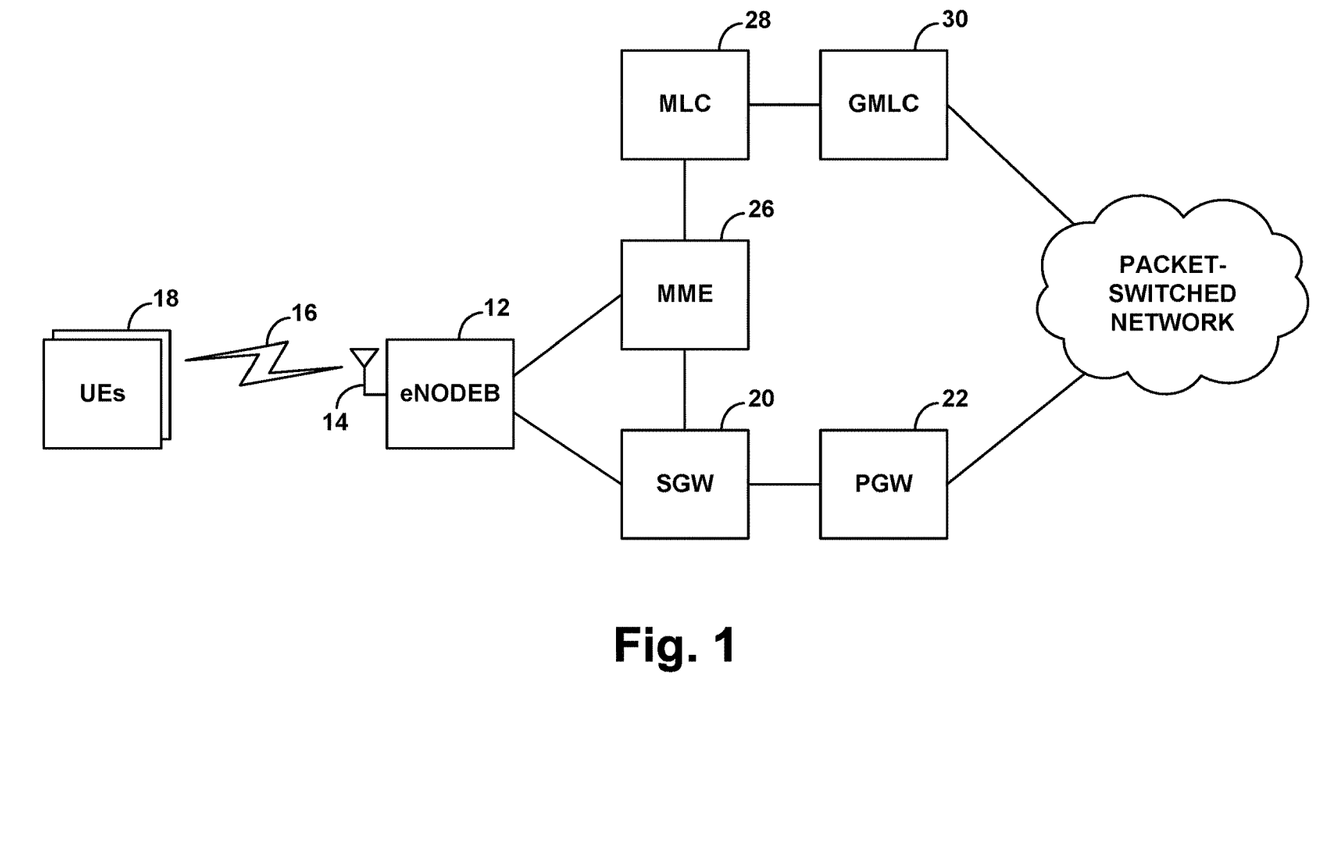
FIG. 1 is a simplified block diagram of an example LTE network in which features of the present disclosure can be implemented.

The eNodeB in this arrangement could take various forms and could be positioned in various locations, whether indoors or outdoors. For instance, the eNodeB could be a macro eNodeB or small cell or relay eNodeB, having its antenna 14 mounted on a tower, so as to provide a desired range of coverage. The eNodeB could include a radio having a transmitter and receiver, with a duplexer coupling the radio with the antenna, to facilitate wireless transmission and reception via the antenna.

The antenna 14 of the eNodeB could also take various forms, optimally providing a directional radiation pattern having a defined RF beam direction including a particular azimuth (e.g., an angle in a reference x-y plane with respect to a reference direction such as true north) and a particular elevation (e.g., with respect to a reference x-y plane). In an example implementation, for instance, the antenna 14 could be a phased array, having multiple antenna elements each configured to transmit with a specified respective phase so that the combined transmission from the multiple antenna elements provides the RF beam direction of the radiation pattern. Further, some or all of the antenna elements could also function to receive uplink transmissions.

In accordance with LTE, the air interface of coverage area 16 is configured on a carrier, which could be frequency division duplex (FDD), having separate frequency bandwidths for concurrent downlink and uplink communication or could be time division duplex (TDD), having a common frequency bandwidth multiplexed over time between downlink and uplink use. Representative LTE bandwidths include 1.4 MHz, 3 MHz, 5 MHz, 10 MHz, 15 MHz, and 20 MHz, among other possibilities.

Under LTE, the frequency bandwidth of the air interface is divided into 15-kHz subcarriers. Further, the air interface is divided over time into a continuum of 10-ms frames, each frame is divided into ten 1-ms subframes (or transmission time intervals (TTIs)), and each subframe is divided into 14 symbol time segments each 66.7 microseconds in duration. As a result, the LTE air interface defines an array of air-interface resource elements, each occupying a 15 kHz subcarrier, and each spanning a 66.7 microsecond symbol time segment. Through use of an agreed modulation scheme, the subcarriers of these resource elements can then be modulated to carry data (e.g., control signaling and/or bearer data) over the air between the eNodeB and UEs. Further, in each subframe, the resource elements across the carrier bandwidth are divided into groups of twelve to define physical resource blocks (PRBs) each 12 subcarriers wide.

LTE reserves certain ones of these resource elements for use. For instance, on the downlink, resource elements in the first one to three symbol time segments per subframe are generally reserved to carry control signaling from the eNodeB to UEs, and the resource elements in the remaining symbol time segments are generally reserved to carry scheduled bearer communications and the like. Further, certain resource elements distributed throughout the bandwidth per subframe on the downlink are reserved to carry a cell-specific reference signal that UEs can measure to evaluate downlink signal strength, and certain other resource elements in particular subframes are reserved to carry other signals, such as synchronization signals, and system information broadcasts. And on the uplink, certain resource elements at the low end and high end of the carrier bandwidth are generally reserved to carry control signaling from UEs to the eNodeB, and the resource elements in the remaining portion of the bandwidth are generally reserved to carry scheduled bearer communications and the like.

When a UE 18 initially enters into coverage of this network, the UE 18 could engage in signaling with the eNodeB 12 to establish a radio-link-layer connection (e.g., Radio Resource Control (RRC) connection) between the UE and the eNodeB, and the UE could then engage in signaling via the eNodeB with the MME 24 to attach or register with the network. Through the attachment process, the MME could facilitate authentication of the UE and could then engage in signaling with the eNodeB 12 and the SGW 20, with the SGW 20 further engaging in signaling with the PGW 22, to set up one or more bearer tunnels ultimately extending between the UE and the PGW, so that the UE could then engage in packet-data communication on network 24.

Once the UE is so attached, the eNodeB could then serve the UE in an RRC-connected mode, in which the eNodeB coordinates air interface communication between the eNodeB and the UE. For instance, when data arrives over a UE bearer at the eNodeB for downlink transmission to the UE, the eNodeB could allocate one or more PRBs of a subframe to carry the data to the UE, the eNodeB could transmit to the UE in that subframe a scheduling directive that informs the UE of the allocated PRB(s), and the eNodeB could transmit the data to the UE in the allocated PRB(s). And when the UE has data to transmit on network 24, the UE could send a scheduling request to the eNodeB, and the eNodeB could allocate one or more PRBs of a subframe to carry the data from the UE and could transmit to the UE a scheduling directive that informs the UE of the allocated PRB(s), and the UE could transmit the data to the eNodeB in the allocated PRB(s) for forwarding in turn over a UE bearer to the PGW.

When UEs are so served by an eNodeB, the UEs could from time to time transmit to eNodeB a report of downlink signal strength that the UE detects from the eNodeB. For instance, the UEs could transmit measurement reports that specify measured reference signal receive power (RSRP) (a form of receive strength signal indicator (RSSI)) based on evaluation of the receive strength of the eNodeB's cell-specific reference signal. A UE could be configured to provide these reports periodically or in response to detecting certain measurement thresholds. The eNodeB could then use these measurement reports for various purposes, such as to trigger handover of a UE to another coverage area for instance.

In the illustrated network, the MLC 26 serves to facilitate determination and reporting of UE location, and the GMLC operates as front-end gateway through which external requests for UE location could be presented to the MLC. In a representative LTE implementation, the MLC could engage in signaling with a UE to ascertain information about the signals that the UE is receiving from one or more eNodeBs in the network, and the MLC could use that information as a basis to compute the UE's location. Further, the eNodeB itself and one or more other network entities could from time to time use such information to determine the location of a served UE.

Figure 2:
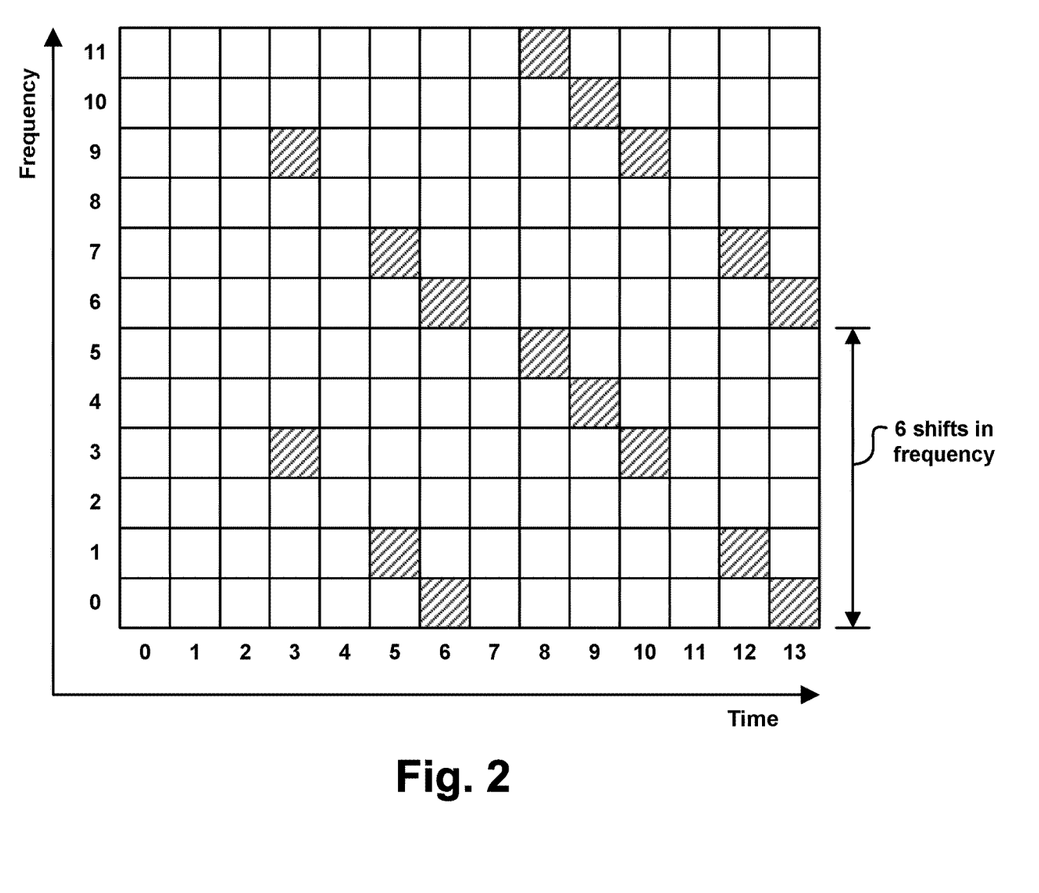
FIG. 2 depicts an example portion of an LTE air interface, showing an example configuration of a positioning reference signal.

To facilitate this, LTE reserves certain resource elements in particular subframes of each coverage area to carry a positioning reference signal (PRS) having specific transmission timing. FIG. 2 depicts an example PRB within a representative LTE subframe and depicts an example PRS configuration within the PRB. As shown, the example PRB spans 12 subcarriers in the frequency domain (along the y axis) and 14 symbol time segments in the time domain (along the x axis). The example PRS is then mapped to a specific pattern of resource elements shown shaded. Transmission of the PRS within these resource elements could be done using quadrature phase shift keying (QPSK) modulation and at a particular transmission power level.

To help distinguish PRS transmissions in neighboring coverage areas that operate on the same carrier frequency as each other, the PRS resource-element patterns in neighboring coverage areas could be frequency-shifted in relation to each other. By standard, for instance, a base pattern position could be defined as shown in FIG. 2, and the pattern as a whole could be shifted by up to five resource elements in frequency (five subcarriers), as shown. This would thereby define six possible PRS configurations, one with the PRS resource element pattern at the base position, and each other being shifted as a whole by from one to five resource elements in frequency.

When a UE is within coverage of one or more eNodeBs, the UE could determine a time of arrival (TOA, i.e., time of UE receipt) of signaling from each eNodeB based on time of the UE's receipt of the eNodeB's PRS, and the UE could report information regarding this TOA to the MLC or eNodeB, to facilitate UE location determination. For instance, the UE could report the TOA from its serving eNodeB to the eNodeB. Or the UE could determine observed differences between time of arrival (OTDOA) as between pairs of eNodeBs and could report these OTDOA values to the MLC. Given this information, and given knowledge of the RF beam direction (e.g., azimuth and/or elevation) of each such eNodeB's antenna, as well as other applicable information such as eNodeB location and uplink angle of arrival, the eNodeB and/or MLC could then geometrically compute the UE's geographic location.

As noted above, the RF beam direction of an eNodeB's antenna could be specified in a configuration record accessible in the network. This configuration record could be stored at the eNodeB, at the MLC, and/or at one or more other locations, for use to facilitate UE location determination and for other purposes such as RF planning and the like. In practice, when eNodeB 12 is put into service, the RF beam direction of the antenna could be automatically or manually measured, and the RF beam direction could be stored in the configuration record for reference.

Figure 3:
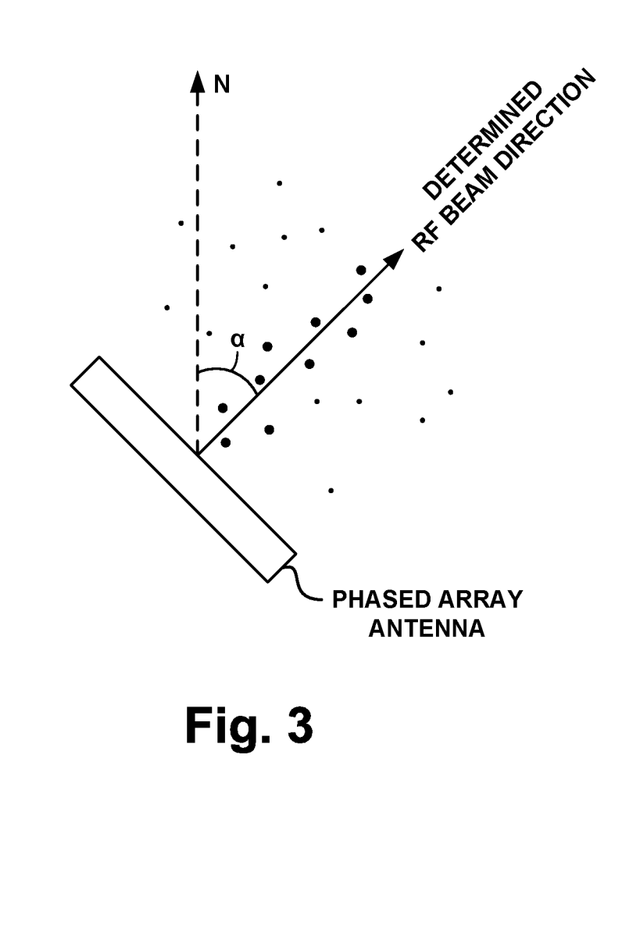
FIG. 3 is a top-down view of an eNodeB antenna and its coverage area, illustrating use of locations at which UEs report downlink RF signal strength to estimate eNodeB antenna azimuth.

In a representative implementation, at least the azimuth of an eNodeB antenna could be automatically determined based on an evaluation of locations where UEs have reported downlink signal strength to the eNodeB. FIG. 3 is a top-down view of an eNodeB antenna and its coverage area, illustrating how this could work in practice.

Namely, FIG. 3 depicts an eNodeB antenna serving over time numerous UEs at locations represented by dots in the figure. The heavier dots represent locations where UEs have reported relatively strong downlink signal strength to the eNodeB, and the lighter dots represent locations where UEs have reported relatively weak downlink signal strength to the eNodeB. By tracking these locations of downlink signal strength reports, the eNodeB could then programmatically plot the locations and compute a best-fit line (or ray) representing the locations where the strongest downlink signal strength has been reported and that originates at the antenna. And the eNodeB could compute the azimuth of the antenna as the angle $\alpha$ between that line and a reference direction such as true north. The eNodeB could then store this determined azimuth in a configuration record for the antenna, correlated with an identification of the eNodeB coverage area. Further, the eNodeB could report this determined azimuth to the MLC and/or one or more other network entities, which could similarly store the determined azimuth in a configuration record for the antenna.

To facilitate this process (and/or for other purposes), the eNodeB could determine geographic locations where UEs are located when reporting downlink signal strength to the eNodeB. The eNodeB could determine these UE locations in various ways. For example, UEs could be configured to determine their own locations (e.g., using satellite-based positioning such as the Global Positioning System (GPS)) and to report their locations together with their downlink signal strength reports. Namely, each such UE providing a downlink signal strength report could transmit to the eNodeB a signaling message that carries both an indication of UE measured downlink signal strength and UE geographic location. The eNodeB could thus receive these reports from the UEs and keep track of the reported UE location per downlink signal strength report. Alternatively, the eNodeB could use other mechanisms to determine locations of UEs corresponding with the UEs' downlink signal strength reports.

Whether the RF beam direction of an antenna is established automatically or through manual measurement, the RF beam direction as indicated in the antenna's configuration record would optimally be correct, so that UE location determination and other operations based on the antenna's RF beam direction would be correct as well. As noted above, however, the physical orientation of an eNodeB antenna might change over time, and as a result, the RF beam direction specified in the antenna's configuration record could be incorrect, which could result in erroneous UE location determination and other operations.

Figure 4:
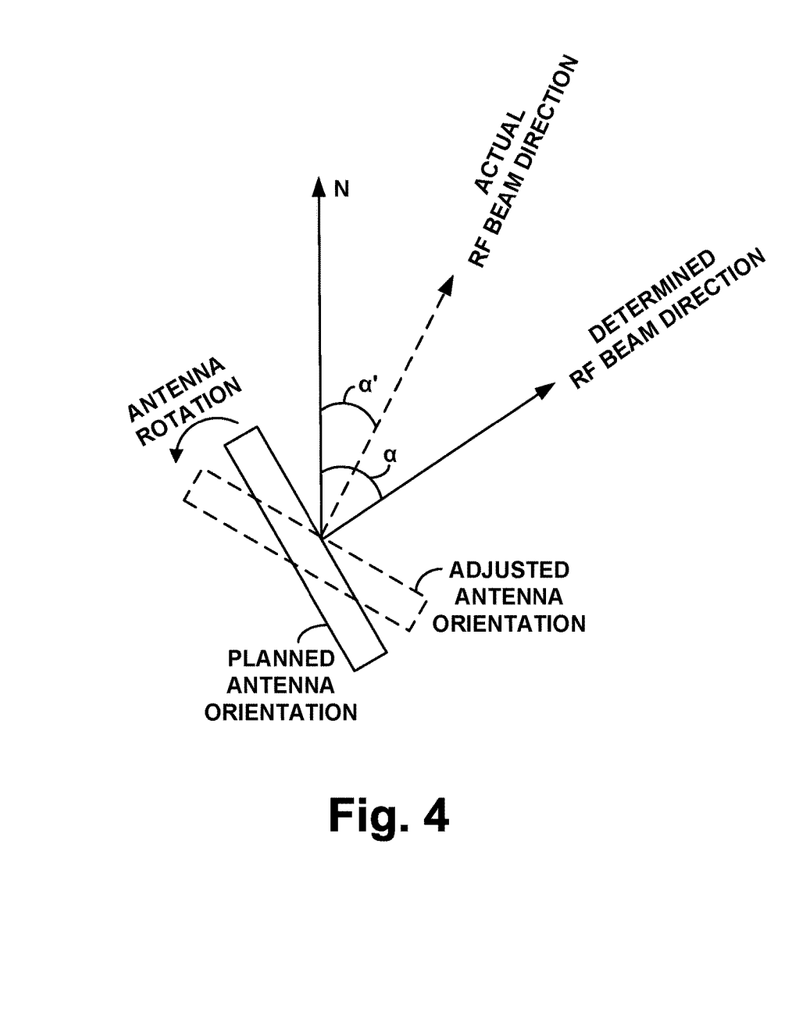
FIG. 4 is a top-down view illustrating an example change in orientation and associated RF beam direction of an eNodeB antenna.

FIG. 4 is a top-down view illustrating an example change in the orientation and associated RF beam direction of an eNodeB antenna. As shown in FIG. 4, the antenna has an initial (planned) physical orientation with an associated RF beam direction (angle $\alpha$) recorded in a configuration record. Over time, the antenna might rotate to some extent, resulting in an actual, current RF beam direction (angle $\alpha'$) that is different than the RF beam direction recorded in the configuration record. Thus, the antenna's configuration record would specify an erroneous RF beam direction of the antenna.

To help address this issue as noted above, the present disclosure provides for monitoring an RF fingerprint of the antenna's environment to determine when an unexpected change occurs in the RF fingerprint, indicating a possible change in the antenna's RF beam direction. And in response to detecting the unexpected change in the RF fingerprint, corrective action could be taken. Namely, the antenna's actual RF beam direction could be newly determined, and the configuration record of the antenna could be updated to indicate the newly determined RF beam direction of the antenna in place of the previously determined and possibly erroneous RF beam direction of the antenna. These operations could be carried out by the eNodeB whose antenna is at issue and/or by one or more other network entities.

Figure 5:
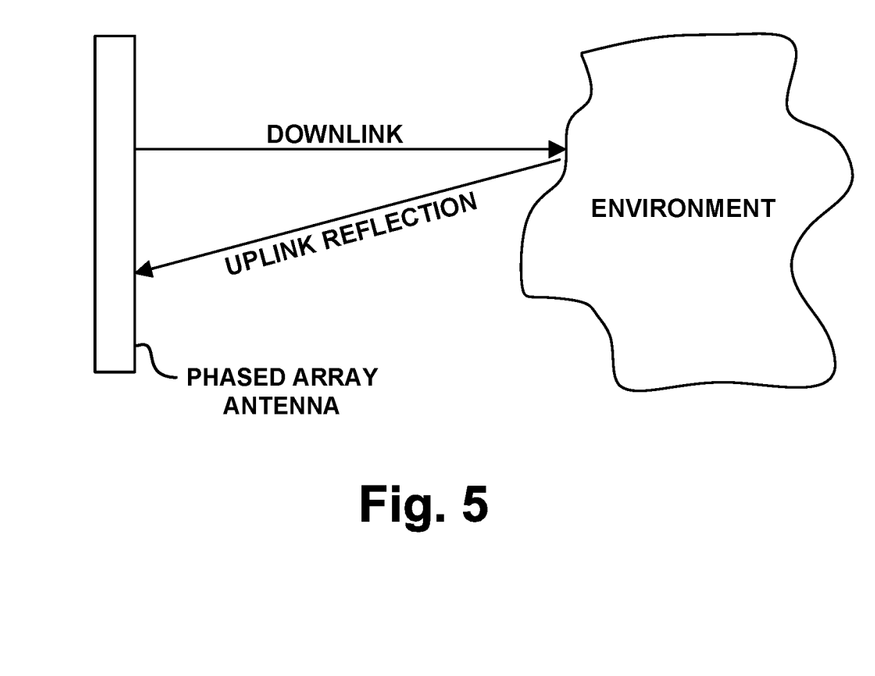
FIG. 5 is a top-down view illustrating downlink transmission from an eNodeB antenna and corresponding uplink reflection of the downlink transmission.

As noted above, establishing an RF fingerprint of the environment of the antenna could involve evaluating uplink reflections of downlink transmission from the antenna and determining as the RF fingerprint one or more RF metrics of the uplink reflections, such as signal strength, signal delay, and phase, among other possibilities. FIG. 5 illustrates representative downlink transmission from an eNodeB antenna and corresponding uplink reflection of the downlink transmission. In practice, the downlink transmission could occur on a downlink frequency, and the uplink reflection could thus be detected on that same frequency and evaluated to establish an RF fingerprint of the uplink reflection.

The theory here is that downlink transmission from the antenna would ordinarily reflect off of objects in the environment of the antenna, generating uplink reflections that would be received by the antenna. Assuming generally no change in the environment of the antenna and no change in the RF beam direction of the antenna, the RF metrics of these uplink reflections may remain relatively constant. For instance, at each of various antenna elements of a phased array antenna, the receive signal strength of these uplink reflections may remain relatively constant, the time delay between the downlink transmission and the received uplink reflection may remain relatively constant, and the relative phase of the uplink reflections may remain relatively constant. Given seasonal changes in the environment, there could be expected changes in this RF fingerprint on a seasonal basis. But assuming no other substantial changes to the environment, these metrics could be expected to remain relatively constant, with relatively minimal deviation.

In accordance with the present disclosure, the eNodeB could regularly (e.g., periodically or in response to other trigger events) evaluate the RF fingerprint of the environment of its antenna by determining RF metrics of uplink reflections of particular downlink transmission from the antenna. For instance, the eNodeB could evaluate the RF fingerprint of the antenna's environment by determining RF metrics of uplink reflections of the eNodeB's PRS transmission via the antenna. As the eNodeB's PRS transmission has a fixed form, occupying specific subcarriers at specific symbol time segments, the eNodeB could evaluate uplink reflections of the PRS to determine RF metrics such as signal strength, delay, and phase, at one or more antenna elements. Like other possible downlink transmissions from the eNodeB, the PRS also has an added benefit of being discontinuous, in that, at least on certain frequencies (e.g., particular subcarriers), the PRS is on sometimes and off sometimes. With that arrangement, the downlink transmission on a given frequency would occur during an on-period, and the receipt and evaluation of an associated uplink reflection of that downlink transmission could then occur immediately thereafter in an off-period.

Alternatively, the eNodeB could evaluate the RF fingerprint of the antenna's environment with respect to uplink reflections of other downlink transmission via the antenna.

The eNodeB could initially engage in a calibration process to determine a baseline RF fingerprint of the environment of the antenna, perhaps on a season-by-season basis or the like. Further, the eNodeB could then continue to regularly evaluate in real-time the RF fingerprint of the environment of the antenna, and could compare a current RF fingerprint with the baseline RF fingerprint (perhaps for the current season) to determine whether the current RF fingerprint diverges sufficiently from the baseline RF fingerprint. Any existing process for comparing possibly multi-variable data sets could be used for this purpose. For example, the eNodeB could compute a Euclidian distance between the current and baseline RF fingerprints. The threshold for sufficient divergence could also be set as a matter of engineering choice to a level that is deemed likely to indicate a possible a change in the antenna's RF beam direction.

In accordance with the present disclosure, when the eNodeB thereby determines that the current RF fingerprint of the environment of the antenna diverges sufficiently from the baseline RF fingerprint of the environment of the antenna, the eNodeB could then take corrective action. In particular, the eNodeB could responsively newly determine the RF beam direction of the antenna, in the manner discussed above for instance, and could accordingly update, and/or cause one or more other entities to update, the RF beam direction in the antenna's configuration record. Further, in an alternative embodiment, the eNodeB could generate and output an alert message that informs engineers or the like of the issue, which could trigger a work to re-adjust the antenna's physical orientation so as to provide an RF beam direction consistent with that in the antenna's configuration record.

Figure 6:
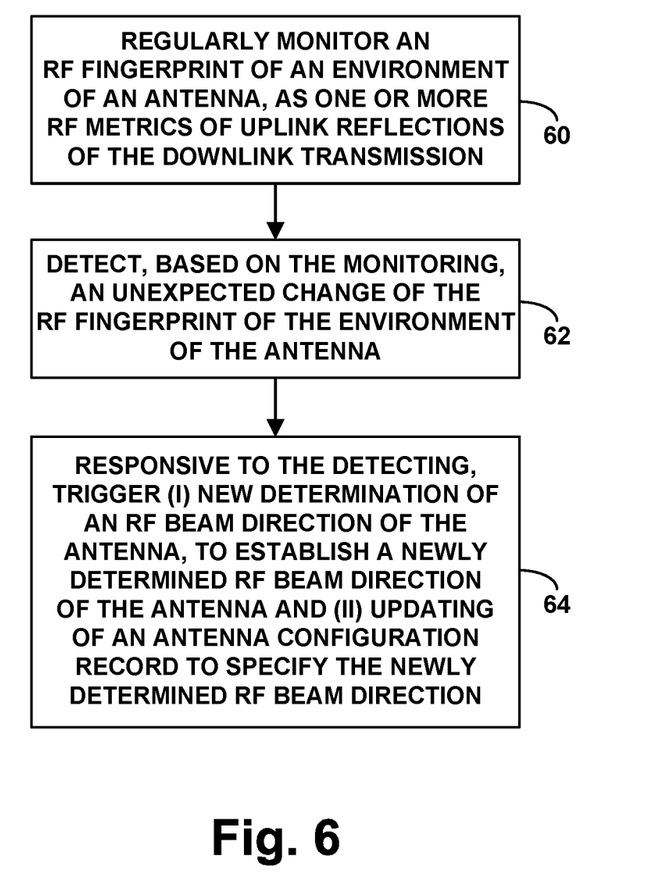
FIG. 6 is a flow chart depicting operations that can be carried out in accordance with the disclosure.

FIG. 6 is next a flow chart depicting a method that can be carried out in accordance with the present disclosure, for updating a configuration record of an antenna of a base station, where the base station regularly provides downlink transmission via the antenna, and where the configuration record specifies an RF beam direction of the antenna. As shown in FIG. 6, at block 60, the method includes regularly monitoring an RF fingerprint of an environment of the antenna, as one or more RF metrics of uplink reflections of the downlink transmission. At block, 62, the method further includes detecting, based on the monitoring, an unexpected change of the RF fingerprint of the environment of the antenna. And at block 64, the method then includes, responsive to the detecting, triggering (i) new determination of the RF beam direction of the antenna, to establish a newly determined RF beam direction of the antenna and (ii) updating of the configuration record to specify the newly determined RF beam direction of the antenna in place of the specified RF beam direction of the antenna.

In line with the discussion above, the act of regularly monitoring the RF fingerprint of the environment of the antenna could involve regularly establishing the RF fingerprint as the one or more RF metrics of the uplink reflections, the one or more RF metrics comprising at least one metric selected from the group consisting of signal strength, delay, and phase. Further, the RF beam direction of the antenna could an azimuth of the antenna, and the act of newly determining the RF beam direction of the antenna could involve (i) determining locations at which user equipment devices served by the base station have reported strongest downlink signal strength from the base station and (ii) determining the azimuth of the antenna as an angle of a best-fit line representing the determined locations and originating at the antenna.

In this and other implementations, the act of triggering various features could involve carrying out the features and/or signaling to one or more other entities to cause the one or more other entities to carry out the features.

Figure 7:
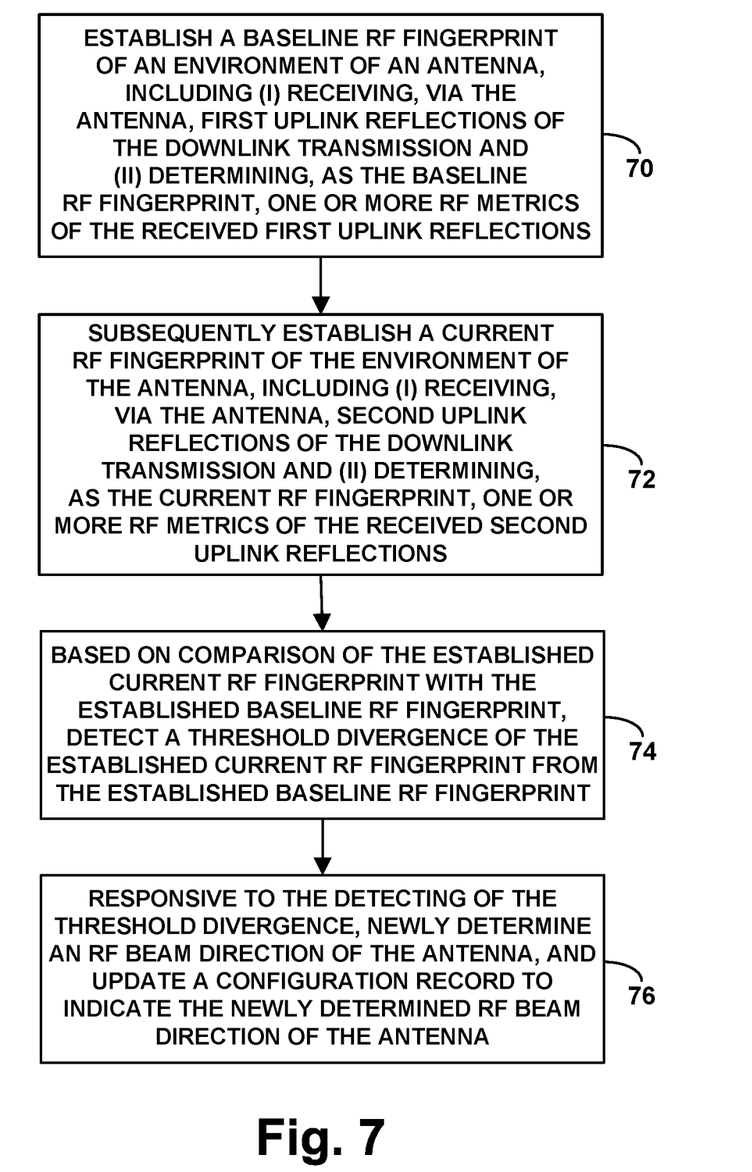
FIG. 7 is another flow chart depicting operations that can be carried out in accordance with the disclosure.

FIG. 7 is next another flow chart depicting a method that can be carried out in accordance with the present disclosure, for updating a configuration record of an antenna of a base station, where the base station regularly provides downlink transmission via the antenna, and where the configuration record specifies an RF beam direction of the antenna.

As shown in FIG. 7, at block 70, the method includes establishing a baseline RF fingerprint (perhaps seasonally) of an environment of the antenna, where establishing the baseline RF fingerprint of the environment of the antenna includes (i) receiving, via the antenna, first uplink reflections of the downlink transmission and (ii) determining, as the baseline RF fingerprint, one or more RF metrics of the received first uplink reflections. Further, at block 72, the method includes subsequently establishing a current RF fingerprint of the environment of the antenna, where establishing the current RF fingerprint of the environment of the antenna includes (i) receiving, via the antenna, second uplink reflections of the downlink transmission and (ii) determining, as the current RF fingerprint, one or more RF metrics of the received second uplink reflections.

At block 74, the method the includes, based on comparison of the established current RF fingerprint with the established baseline RF fingerprint, detecting a threshold divergence of the established current RF fingerprint from the established baseline RF fingerprint. And at block 76, the method includes, responsive to the detecting of the threshold divergence, newly determining the RF beam direction of the antenna, and updating the configuration record to indicate the newly determined RF beam direction of the antenna in place of the specified RF beam direction of the antenna.

In line with the discussion above, at least the acts of establishing of the baseline RF fingerprint, the establishing of the current RF fingerprint, and the detecting of the threshold divergence could be carried out by the base station and/or by one or more other entities. Further, the downlink transmission could comprise a pilot signal (such as a positioning reference signal) from the base station. And still further, such a downlink transmission on at least a given frequency could be discontinuous, in which case the acts of receiving the first uplink reflections and receiving the second uplink reflections could each occur in a respective off-period of the downlink transmission.

As further discussed above, the one or more RF metrics of the first uplink reflections could include at least one metric selected from the group consisting of signal strength, delay, and phase, and the one or more RF metrics of the second uplink reflections could then similarly comprise the at least one metric selected from the group consisting of signal strength, delay, and phase.

Further, as discussed above, the RF beam direction of the antenna could include an azimuth of the antenna or an elevation of the antenna. As to at least an azimuth, the act of newly determining the RF beam direction of the antenna could then comprise (i) determining locations at which user equipment devices served by the base station have reported strongest downlink signal strength from the base station and (ii) determining the azimuth of the antenna as an angle of a best-fit line representing the determined locations and originating at the antenna. Moreover, the act of determining locations at which UEs served by the base station have reported strongest downlink signal strength from the base station could comprise the base station receiving, from the UEs devices, downlink signal strength reports with corresponding geographic locations of the user equipment devices, and the base station could determine the azimuth of the antenna.

Still further, as discussed above, the configuration record of the antenna could be accessible by a network entity that is configured to use the RF beam direction of the antenna as a basis to determine location of a user equipment device served by the base station. For instance, the configuration record could be accessible by the base station and/or by a mobile location center.

Figure 8:
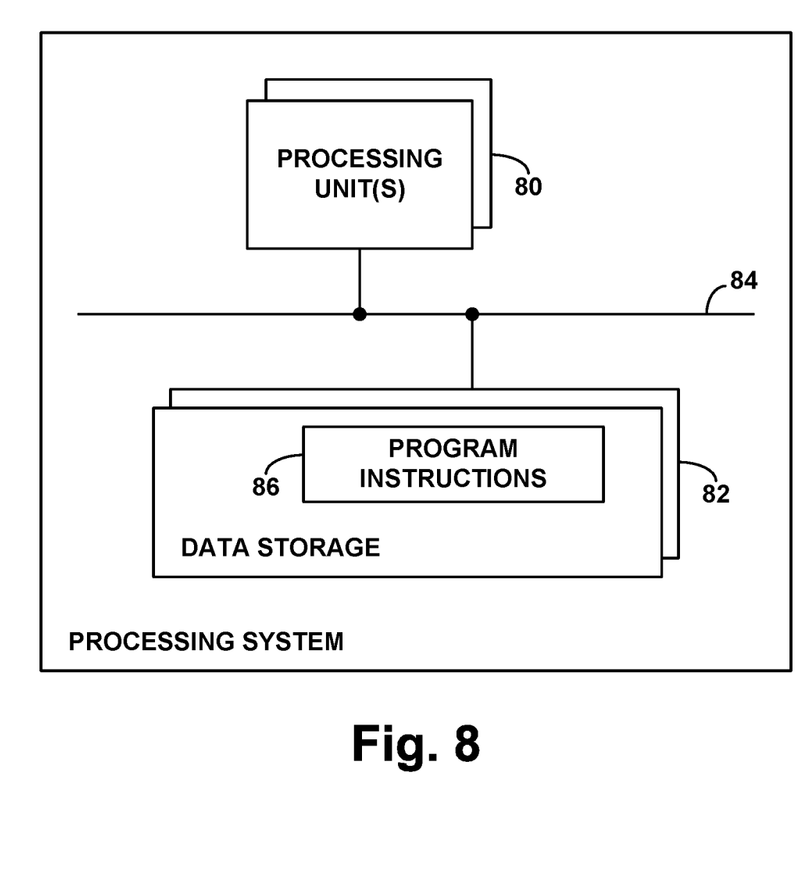
FIG. 8 is a simplified block diagram of a processing system operable in accordance with the disclosure.

FIG. 8 is next a simplified block diagram of an example processing system configured to implement features such as those described above. This processing system could be provided as or in cooperation with the base station whose antenna is at issue and/or as or in cooperation with one or more other entities. As shown in FIG. 8, the processing system includes at least one processing unit 80 (e.g., one or more general purpose processors (e.g., microprocessors) and/or one or more special-purpose processors (e.g., application specific integrated circuits)) and at least one non-transitory data storage 82 (e.g., one or more volatile and/or non-volatile storage components such as magnetic, optical, or flash storage). These components could be integrated together, distributed, or communicatively linked together by a system bus, network, or other connection mechanism 84. As shown, the data storage in this example processing system stores program instructions 86, which would be executable by at least one processing unit 80 to carry out various operations as discussed above.

Exemplary embodiments have been described above. Those skilled in the art will understand, however, that changes and modifications may be made to these embodiments without departing from the true scope and spirit of the invention.

What is claimed is:

1. A method for updating a configuration record of an antenna of a base station to help facilitate mobile location determination, wherein the base station regularly provides downlink transmission via the antenna, and wherein the configuration record specifies a radio frequency (RF) beam direction of the antenna, the method comprising:
regularly monitoring an RF fingerprint of an environment of the antenna, as one or more RF metrics of uplink reflections of the downlink transmission;
detecting, based on the monitoring, an unexpected change of the RF fingerprint of the environment of the antenna; and
responsive to the detecting, triggering (i) new determination of the RF beam direction of the antenna, to establish a newly determined RF beam direction of the antenna and (ii) updating of the configuration record to specify the newly determined RF beam direction of the antenna in place of the specified RF beam direction of the antenna, wherein the configuration record is useable to facilitate mobile location determination based on the specified RF beam direction of the antenna, and wherein the configuration record updated to specify the newly determined RF beam direction of the antenna is useable to facilitate improved mobile location determination.

2. The method of claim 1, wherein regularly monitoring the RF fingerprint of the environment of the antenna comprises regularly establishing the RF fingerprint as the one or more RF metrics of the uplink reflections, the one or more RF metrics comprising at least one metric selected from the group consisting of signal strength, delay, and phase.

3. The method of claim 1, wherein the RF beam direction of the antenna comprises an azimuth of the antenna, and wherein newly determining the RF beam direction of the antenna comprises (i) determining locations at which user equipment devices served by the base station have reported strongest downlink signal strength from the base station and (ii) determining the azimuth of the antenna as an angle of a best-fit line representing the determined locations and originating at the antenna.

4. A method for updating a configuration record of an antenna of a base station, wherein the base station regularly provides downlink transmission via the antenna, and wherein the configuration record specifies a radio frequency (RF) beam direction of the antenna, the method comprising:
establishing a baseline RF fingerprint of an environment of the antenna, wherein establishing the baseline RF fingerprint of the environment of the antenna includes (i) receiving, via the antenna, first uplink reflections of the downlink transmission and (ii) determining, as the baseline RF fingerprint, one or more RF metrics of the received first uplink reflections;
subsequently establishing a current RF fingerprint of the environment of the antenna, wherein establishing the current RF fingerprint of the environment of the antenna includes (i) receiving, via the antenna, second uplink reflections of the downlink transmission and (ii) determining, as the current RF fingerprint, one or more RF metrics of the received second uplink reflections;
based on comparison of the established current RF fingerprint with the established baseline RF fingerprint, detecting a threshold divergence of the established current RF fingerprint from the established baseline RF fingerprint; and
responsive to the detecting of the threshold divergence, newly determining the RF beam direction of the antenna, and updating the configuration record to indicate the newly determined RF beam direction of the antenna in place of the specified RF beam direction of the antenna.

5. The method of claim 4, wherein at least the establishing of the baseline RF fingerprint, the establishing of the current RF fingerprint, and the detecting of the threshold divergence are done by the base station.

6. The method of claim 4, wherein the downlink transmission comprises a pilot signal from the base station.

7. The method of claim 4, wherein the downlink transmission on at least a given frequency is discontinuous, wherein receiving the first uplink reflections and receiving the second uplink reflections each occur in a respective off-period of the downlink transmission.

8. The method of claim 4, wherein the one or more RF metrics of the first uplink reflections comprise at least one metric selected from the group consisting of signal strength, delay, and phase, and wherein the one or more RF metrics of the second uplink reflections comprise at least one metric selected from the group consisting of signal strength, delay, and phase.

9. The method of claim 4, wherein the baseline RF fingerprint is seasonal.

10. The method of claim 4, wherein the RF beam direction of the antenna comprises at least one of an azimuth of the antenna or an elevation of the antenna.

11. The method of claim 4, wherein the RF beam direction of the antenna comprises an azimuth of the antenna, and wherein newly determining the RF beam direction of the antenna comprises (i) determining locations at which user equipment devices served by the base station have reported strongest downlink signal strength from the base station and (ii) determining the azimuth of the antenna as an angle of a best-fit line representing the determined locations and originating at the antenna.

12. The method of claim 11,
wherein determining locations at which user equipment devices served by the base station have reported strongest downlink signal strength from the base station comprises the base station receiving, from the user equipment devices, downlink signal strength reports with corresponding geographic locations of the user equipment devices, and
wherein determining the azimuth of the antenna comprises the base station determining the azimuth of the antenna.

13. The method of claim 4, wherein the configuration record of the antenna is accessible by a network entity that is configured to use the RF beam direction of the antenna as a basis to determine location of a user equipment device served by the base station.

14. The method of claim 13, wherein the network entity is the base station.

15. The method of claim 13, wherein the network entity is a mobile location center.

16. A system for updating a configuration record of an antenna of a base station, wherein the base station regularly provides downlink transmission via the antenna, and wherein the configuration record specifies a radio frequency (RF) beam direction of the antenna, the system comprising:
at least one processing unit;
at least one non-transitory data storage; and
program instructions stored in the at least one non-transitory data storage and executable by the at least one processing unit to carry out operations including:
(a) establishing a baseline RF fingerprint of an environment of the antenna, wherein establishing the baseline RF fingerprint of the environment of the antenna includes (i) receiving, via the antenna, first uplink reflections of the downlink transmission and (ii) determining, as the baseline RF fingerprint, one or more RF metrics of the received first uplink reflections,
(b) subsequently establishing a current RF fingerprint of the environment of the antenna, wherein establishing the current RF fingerprint of the environment of the antenna includes (i) receiving, via the antenna, second uplink reflections of the downlink transmission and (ii) determining, as the current RF fingerprint, one or more RF metrics of the received second uplink reflections,
(c) based on comparison of the established current RF fingerprint with the established baseline RF fingerprint, detecting a threshold divergence of the established current RF fingerprint from the established baseline RF fingerprint, and
(d) responsive to the detecting of the threshold divergence, newly determining the RF beam direction of the antenna, and updating the configuration record to indicate the newly measured RF beam direction of the antenna in place of the specified RF beam direction of the antenna.

17. The system of claim 16, wherein the one or more RF metrics of the first uplink reflections comprise at least one metric selected from the group consisting of signal strength, delay, and phase, and wherein the one or more RF metrics of the second uplink reflections comprise at least one metric selected from the group consisting of signal strength, delay, and phase.

18. The system of claim 16, wherein the configuration record is stored at a mobile location center, and wherein updating the configuration record to indicate the newly measured RF beam direction comprises transmitting from the base station to the mobile location center the newly measured RF beam direction of the antenna for updating of the configuration record at the mobile location center.

19. The system of claim 16, wherein the RF beam direction of the antenna comprises an azimuth of the antenna, and wherein newly measuring the RF beam direction of the antenna comprises (i) determining locations at which user equipment devices served by the base station have reported strongest downlink signal strength from the base station and (ii) determining the azimuth of the antenna as an angle of a best-fit line representing the determined locations and originating at the antenna.

20. The system of claim 19, wherein determining locations at which user equipment devices served by the base station have reported strongest downlink signal strength from the base station comprises receiving, from the user equipment devices, downlink signal strength reports with corresponding geographic locations of the user equipment devices.

* * * * *